United States Patent
Chu et al.

(10) Patent No.: US 11,443,226 B2
(45) Date of Patent: Sep. 13, 2022

(54) TRAINING A MACHINE LEARNING MODEL IN A DISTRIBUTED PRIVACY-PRESERVING ENVIRONMENT

(71) Applicant: International Business Machines Corporation, Armonk, NY (US)

(72) Inventors: Stephen M. Chu, Beabercreek, OH (US); Min Gong, Shanghai (CN); Guo Qiang Hu, Shanghai (CN); Dong Sheng Li, Shanghai (CN); Liang Wu, Shanghai (CN); Jun Chi Yan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 15/597,242

(22) Filed: May 17, 2017

(65) Prior Publication Data
US 2018/0336486 A1     Nov. 22, 2018

(51) Int. Cl.
    *G06N 20/00*     (2019.01)
(52) U.S. Cl.
    CPC .................. *G06N 20/00* (2019.01)
(58) Field of Classification Search
    CPC .................................................. G06N 20/00
    See application file for complete search history.

(56) References Cited

U.S. PATENT DOCUMENTS

| | | | |
|---|---|---|---|
| 9,413,779 B2 | 8/2016 | Vasseur et al. | |
| 2015/0317390 A1* | 11/2015 | Mills | G06F 16/36 707/777 |
| 2016/0064047 A1* | 3/2016 | Tiwari | G11C 7/22 365/189.05 |
| 2016/0132787 A1 | 5/2016 | Drevo et al. | |
| 2016/0217388 A1* | 7/2016 | Okanohara | G06N 20/00 |
| 2018/0032908 A1* | 2/2018 | Nagaraju | G06N 20/00 |
| 2018/0041528 A1* | 2/2018 | Machlica | H04L 41/12 |
| 2018/0181593 A1* | 6/2018 | Ranzinger | G06F 16/5838 |
| 2018/0191729 A1* | 7/2018 | Whittle | H04L 67/12 |
| 2018/0375720 A1* | 12/2018 | Yang | G06N 20/00 |

FOREIGN PATENT DOCUMENTS

WO     2016004075 A1     6/2016

OTHER PUBLICATIONS

Hamm, Jihun, Yingjun Cao, and Mikhail Belkin. "Learning privately from multiparty data." International Conference on Machine Learning. 2016. (Year: 2016).*

(Continued)

*Primary Examiner* — Li B. Zhen
*Assistant Examiner* — Henry Nguyen
(74) *Attorney, Agent, or Firm* — Jared L. Montanaro

(57) ABSTRACT

A computer-implemented method applies labels to unlabeled public data for use by a global model. One or more processors train one or more local machine learning models with local private data to create one or more trained models. Processor(s) generate a label for each of the local private data using the one or more trained models, where each label describes the local private data, and then apply the label to unlabeled public data to create labeled public data. One or more processors then input the labeled public data into a global model that uses the public data.

16 Claims, 6 Drawing Sheets

(56) References Cited

OTHER PUBLICATIONS

Papernot, Nicolas, et al. "Semi-supervised knowledge transfer for deep learning from private training data." arXiv preprint arXiv: 1610.05755 (2016). (Year: 2016).*

P. Mell et al., "The NIST Definition of Cloud Computing", National Institute of Standards and Technology, Information Technology Laboratory, Sep. 2011, pp. 1-7.

Pathak et al., "Multiparty Differential Privacy Via Aggregation of Locally Trained Classifiers", Proceedings of the 23rd International Conference on Neural Information Processing Systems, Vancouver, BC, Canada, Dec. 6-9, 2010, pp. 1876-1884.

Cynthia Dwork, "Differential Privacy". 33rd International Colloquium on Automata, Languages and Programming, part II (ICALP 2006), pp. 1-12.

Hamm et al., "Learning Privately From Multiparty Data". Proceedings of the 33rd International Conference on Machine Learning, New York, NY, USA, 2016.

Hegedus et al., "Distributed Differentially Private Stochastic Gradient Descent: An Empirical Study", 24th Euromicro International Conference on Parallel, Distributed, and Network-Based Processing (PDP), Feb. 17-19, 2016.

Jia et al., "Privacy-Preserving Data Classification and Similarity Evaluation for Distributed Systems". IEEE 36th International Conference on Distributed Computing Systems (ICDCS), Jun. 27-30, 2016.

Ji et al., "Differentially private distributed logistic regression using private and public data." BMC Med Genomics, Selected Articles From the 3rd Translational Bioinformatics Conference (TBC/ISCB-ASIA 2013), vol. 7, Supplement 1, May 8, 2014.

Papernot et al., "Semi-Supervised Knowledge Transfer for Deep Learning From Private Training Data". Under review as a conference paper at ICLR 2017, pp. 1-14.

* cited by examiner

TRAINING A MACHINE LEARNING MODEL IN A DISTRIBUTED PRIVACY-PRESERVING ENVIRONMENT

BACKGROUND

The present invention relates generally to the field of computers. Still more particularly, the present invention relates to the field of computers that are used to train computer models.

SUMMARY

In a computer-implemented method embodiment of the present invention, one or more processors train one or more local machine learning models with local private data to create one or more trained models. Processor(s) generate a label for each of the local private data using the one or more trained models, where each label describes the local private data, and then apply the label to unlabeled public data to create labeled public data. One or more processors then input the labeled public data into a global model that uses public data.

Other embodiments of the present invention include a computer system and a computer program product.

DETAILED DESCRIPTION

Figure 1:
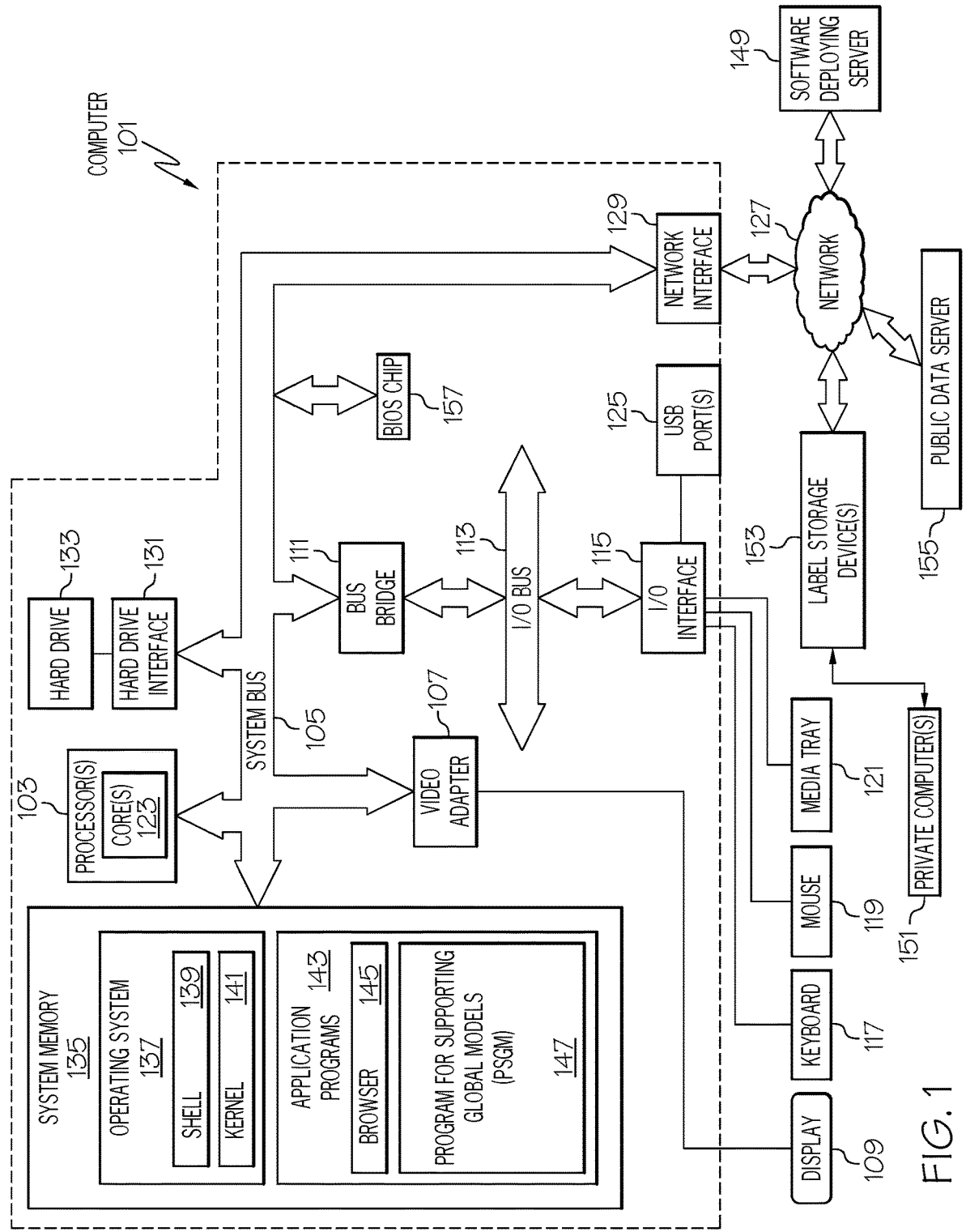
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. In some embodiments, part or all of the exemplary architecture, including both depicted hardware and software, shown as associated with and/or within computer 101 can be utilized by software deploying server 149, private computer(s) 151, label storage device(s) 153, and/or public data server 155 shown in FIG. 1.

With further reference to FIG. 1, exemplary computer 101 includes processor(s) 103, operably coupled to a system bus 105, which further operably couples various internal and external components. Processor(s) 103 may embody or use one or more processor core(s) 123. A video adapter 107, which drives/supports a display 109, is also coupled to system bus 105.

System bus 105 is coupled via a bus bridge 111 to an input/output (I/O) bus 113. An I/O interface 115 is coupled to I/O bus 113. I/O interface 115 enables communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted in FIG. 1, a basic input/output system (BIOS) chip 157 is coupled to system bus 105. BIOS chip 157 is firmware that performs hardware utilization during booting operations of computer 101 by initializing and testing hardware components that are coupled to and/or are within computer 101, and then loads operating system 137 into system memory 135.

As depicted, network interface 129 is also coupled to system bus 105. Network interface 129 can be a hardware network interface, such as a network interface card (NIC), etc. Computer 101 is able to communicate with software deploying server 149, private computer(s) 151, label storage device(s) 153, and/or public data server 155 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 may include one or more wireless networks, such as a Wi-Fi network, and/or cellular networks. An example embodiment of the present invention utilizes a network "cloud" environment, which will be discussed with reference to FIG. 5 and FIG. 6.

Referring again to FIG. 1, a hard drive interface 131 is also coupled to system bus 105. Hard drive interface 131 interfaces with a hard drive 133. In some embodiments, hard drive 133 is a non-volatile form of memory for storing and populating system memory 135 (e.g., a volatile form of memory, such as so-called random access memory (RAM)), which is also coupled to system bus 105.

In some embodiments, system memory may be considered a lowest level of volatile memory in computer 101. System memory 135 may include additional, higher levels of volatile memory (not shown), including, but not limited to, cache memory, registers and buffers. Logic and/or data (not depicted) residing in system memory 135 can include or be associated with operating system (OS) 137 and application programs 143. In some embodiments, part or all of system memory 135 can be shared and/or distributed across one or more systems. In some embodiments, application programs 143 may be distributed across one or more software deploying servers 149 or other systems.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 can include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 include a Program for Supporting Global Models (PSGM) 147. In this example, PSGM 147 includes program instructions (software) adapted for implementing processes and/or functions in accordance with the present invention, such as (without limitation) those described with reference to FIGS. 2-4. In some embodiments, PSGM 147 is downloaded from software deploying server 149, (on-demand or "just-in-time") e.g., where the PSGM 147 software is not downloaded until needed for execution. In some embodiments of the present invention, software deploying server 149 can perform one or more functions associated with the present invention (including execution of PSGM 147), thus freeing computer 101 from having to use its internal computing resources.

The elements depicted in computer 101 are not intended to be exhaustive, but rather are representative to highlight certain components in accordance with example embodiments of the present invention. For instance, computer 101 may include alternate memory storage devices such as flash memory, magnetic cassettes, digital versatile disks (DVDs), Bernoulli cartridges, etc. These and other variations are intended to be within the spirit and scope of the present invention.

Data is often owned by multiple parties instead of a central party. However, each of the multiple parties may not be willing to share their data with other parties, due to concerns about security, proprietary information, sensitive data, etc., particularly when such data is used in cloud computing, cognitive computing, etc. Thus, the data owned each of the multiple parties may be private, and the data owned by the central party is public to any party, including those who sent their own data to the central party.

Such data, whether private or public, can be used to train a model. A model is a digital description of an object or event. That is, a model provides a framework for digital data that identifies and/or describes an object or event.

For example, assume that data is in the form of a pixel vector from a digital photograph. This pixel vector is sent to a machine learning algorithm, which assigns a label to the pixel vector in order to create a local model. If the digital photograph is that of a cat, then other pixel vectors from other digital photographs that are tagged with the label "cat" are used to further train the local model. That is, if there are multiple digital photographs of cats, and each pixel vector for the multiple digital photographs is tagged with the label "cat", then the local model will "learn" what a cat "looks like" based on commonalities among the different pixel vectors.

In some scenarios, each data vector sent to the local model has been previously supplied by the party that supplied the data vector (e.g., manually).

In other scenarios, the label for a particular unlabeled data vector is created by the local model, which recognizes a pattern in that particular unlabeled data vector as being similar to another previously tagged (labeled) data vector. The local model then assigns the label from that previously tagged data vector to the particular unlabeled data vector. These labeled data vectors are then used to further train the local model.

Thus, a key element needed to train a model is the labels for the data vectors. The present invention provides a method for generating such labels for public unlabeled data through the use of 1) private data that 2) is hidden from a public global model.

Figure 2:
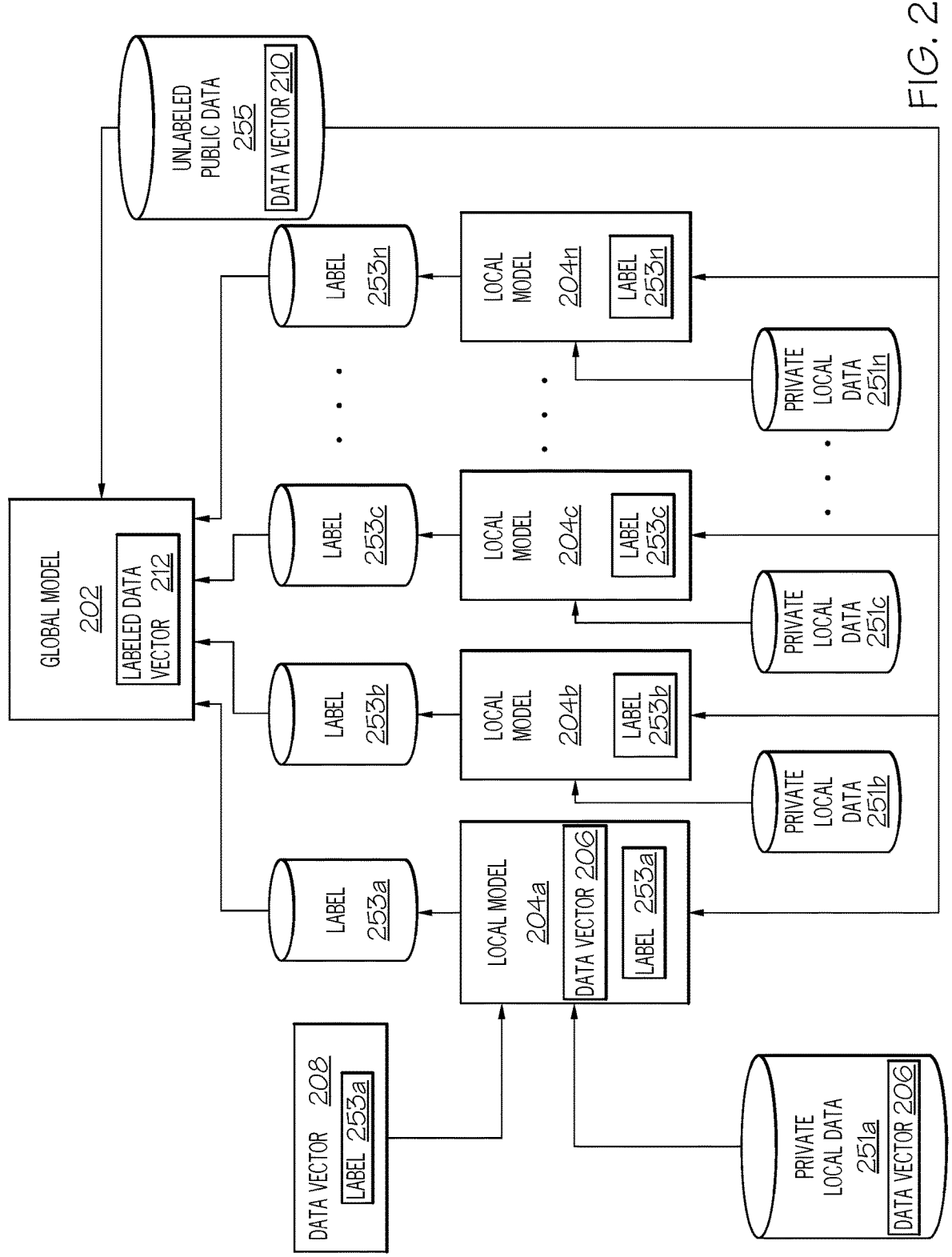
FIG. 2 illustrates an overview of one or more embodiments of the present invention.

With reference then to FIG. 2, assume that one or more of the private computer(s) 151 shown in FIG. 1 contain or otherwise have access to private local data 251a-251n (where "n" is an integer). As the name indicates, private local data 251a-251n is data that is kept confidential by private computer(s) 151, such that the public is not able to access the private local data 251a-251n. That is, private computer(s) 151 keep the private local data 251a-251n behind a firewall or otherwise protected (e.g., by encryption) such that only the authorized private computer(s) 151 are able to access the private local data 251a-251n.

The private local data 251a-251n is used to train the local models 204a-204n, as depicted in FIG. 2. That is, the local models 204a-204n are local machine learning models that are created by an algorithm within the private computer(s) 151 (e.g., PSGM 147 shown in FIG. 1). As such, PSGM 147 either receives labels 253a-253n appended to or otherwise associated with specific data vectors in the private local data 251a-251n, or else the labels 253a-253n are generated by PSGM 147 while the specific data vectors are applied to the local models 204a-204n.

For example, assume that data vector 206 from private local data 251a is sent to local model 204a. If data vector 206 does not have a label already assigned to it, then PSGM 147 (while executing local model 204a) will determine label 253a for the data vector 206. In an embodiment of the present invention, label 253a is created by matching data vector 206 to another data vector 208 that has similar characteristics (e.g., data values that are within a same range of values, a same range of bit quantities, etc.) as data vector 206. As such, the local model 204a will assign label 253a to data vector 206.

Once labels 253a-253n have been generated based on the data vectors found in the private local data 251a-251n, unlabeled public data 255 is run through the local models 204a-204n, wherein corresponding labels from labels 253a-253n are affixed to the unlabeled public data 255.

For example, assume that data vector 210 from unlabeled public data 255 is similar (i.e., has similar values, a similar number of bits, etc.) to data vector 206. As such, when data vector 210 runs through local model 204a, label 253a will be assigned to data vector 210. When global model 202 receives unlabeled data vector 210 from unlabeled public data 255, it will match (e.g., using a lookup table that matches the labels 253a-253n to unlabeled vectors from unlabeled public data 255) data vector 210 to label 253a, in order to create a labeled data vector 212 that can be used by the global model 202. Thus, global model 202, which in one or more embodiments is publically available, is able to use unlabeled public data (e.g., data vector 210) that has now been labeled (e.g., by label 253a) to create labeled data vector 212, while protecting the original private data vector 206 that was used when generating the label 253a.

As the name implies, in one embodiment global model 202 is a same model as one or more of the local models 204a-204n, while in another embodiment global model 202 is different from any of the local models 204a-204n. In either embodiment, however, the labels 253a-253n are created by data from the private local data 251a-251n without revealing the content of the private local data 251a-251n to the global model 202.

Figure 3:
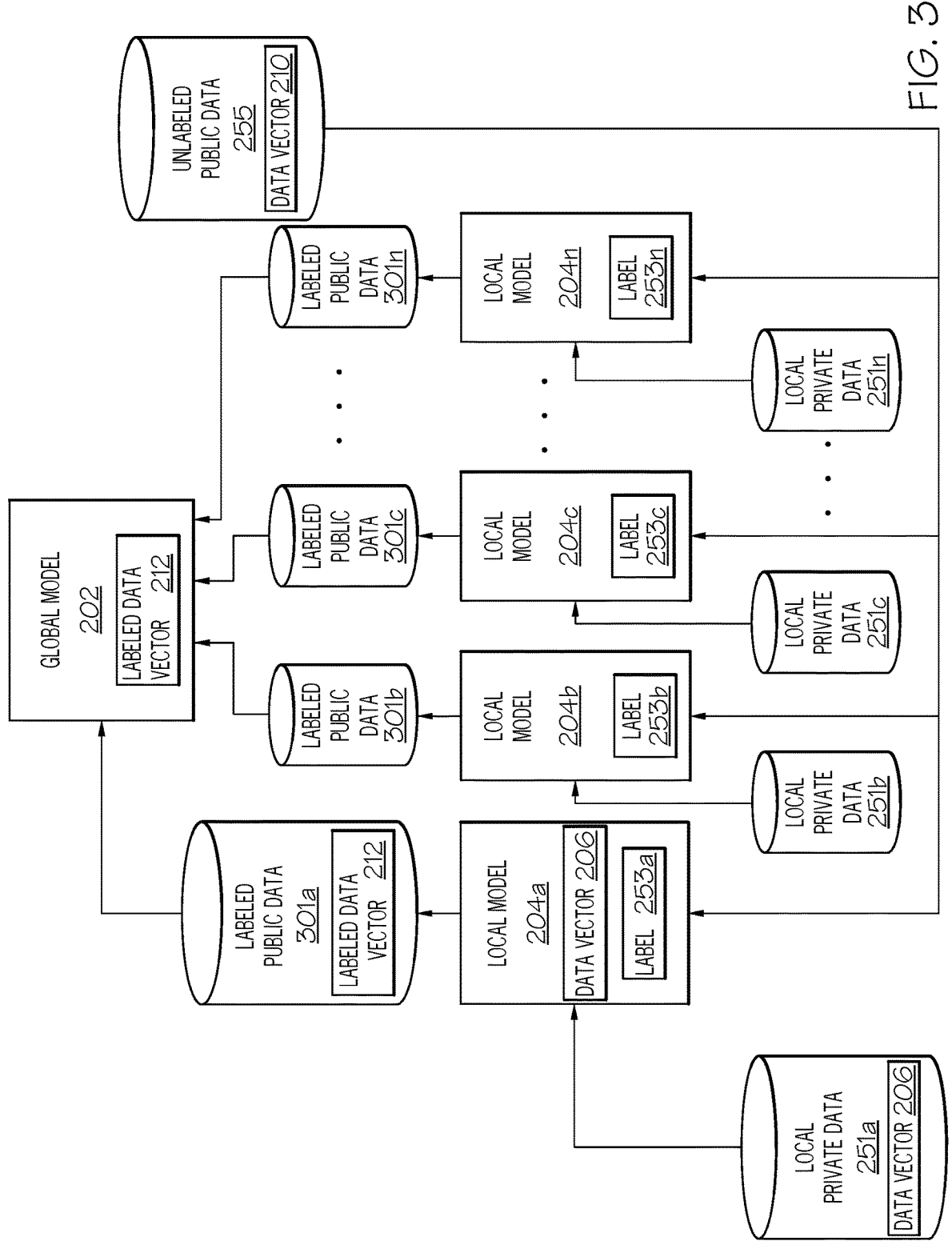
FIG. 3 depicts an overview of one or more other embodiments of the present invention.

With reference now to FIG. 3, in an embodiment of the present invention labeled public data is supplied as direct inputs to the global module 202. That is, assume that, as in FIG. 2, the data vector 210 from the unlabeled public data 255 matches parameters (values, size, etc.) of data vector 206 found in local model 204a. This results in label 253a being assigned to data vector 210, as described in FIG. 2. However, in FIG. 3, label 253a is assigned to (e.g., coupled with) data vector 210 before being sent to labeled public data 301a (from labeled public data 301a-301n), such that labeled data vector 212 (i.e., a vector pair made up of label 253a and data vector 210) is directly available as an input to the global model 202. This eliminates a need for a lookup table or similar logic (as in FIG. 2), and yet maintains the privacy of the data vector 206 that was used to generate (or otherwise determine) label 253a.

Figure 4:
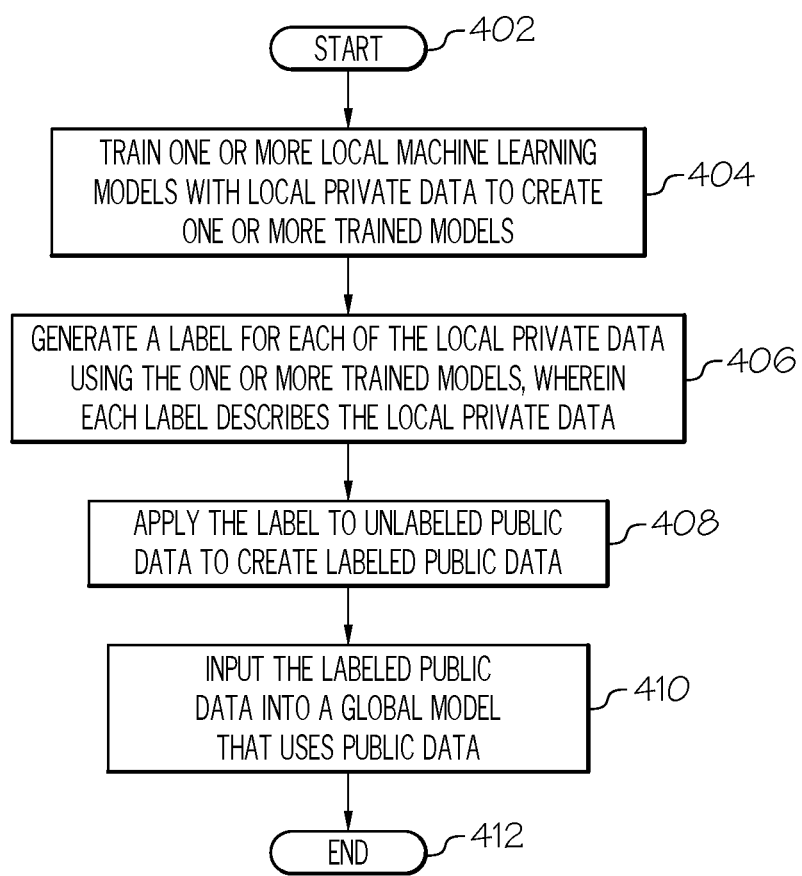
FIG. 4 depicts an exemplary method in accordance with one or more embodiments of the present invention.

With reference now to FIG. 4, a high-level flow-chart of a method to securely generate and utilize labels in a global model is presented.

After initiator block 402, one or more processors (e.g., processor(s) 103 shown in FIG. 1) train one or more local machine learning models (e.g., local models 204a-204n shown in FIGS. 2-3) with local private data (e.g., from local private data 251a-251n) to create one or more trained models (e.g., also local models 204a-204n after they have been trained by local private data 251a-251n), as depicted in block 404.

As described in block 406, one or more processors generate a label (e.g., one or more of the labels 253a-253n shown in FIGS. 2-3) for each of the local private data using the one or more trained models. As described above, each label describes one or more data vectors or other data groupings in the local private data.

As described in block 408, one or more processors apply the label to unlabeled public data (e.g., from unlabeled public data 255 shown in FIGS. 2-3) in order to create labeled public data (e.g., labeled data vector 212 shown in FIGS. 2-3).

As described in block 410, one or more processors (e.g., within computer 101 shown in FIG. 1 when functioning as a platform for global model 202) then input the labeled public data into a global model (e.g., global model 202) that uses public data (e.g., from unlabeled public data 255).

The flow-chart shown in FIG. 4 ends at terminator block 412.

In an embodiment of the present invention, each of the one or more local machine learning models is trained using different local private data that is accessible only to one or more processors that are training said each of the one or more local machine learning models. That is, private local data 251a-251n is available only to private computer(s) 151, and not to computer 101 or any other computer that is executing/implementing global model 202.

In a further embodiment of the present invention, one or more processors train the global model by using the labeled public data as input to the global model. For example, the labeled data vector 212 that is generated as described above is used to train the global model to recognize certain data patterns (e.g., learning how to identify a cat in a photograph based on the structure of a pixel array described by the labeled data vector 212, etc.)

In a further embodiment of the present invention, one or more processors evaluate the global model using the input labeled public data in order to identify an object. For example, the labeled data vector 212 that is generated as described above is used to actually identify a cat in a photograph based on the structure of a pixel array described by the labeled data vector 212, etc.

In an embodiment of the present invention, one or more processors evaluate the global model using the input labeled public data in order to identify an event. For example, the labeled data vector 212 that is generated as described above is used to identify an occurrence of a certain event.

For example, assume that the data vector 210 was generated by sensors found in an Internet of Things (IoTs), which is a group of electronically coupled devices that share sensor data from sensors on the devices. If the unlabeled data vector 210 is assigned label 253a to create labeled data vector 212 shown in FIGS. 2-3, then global model 202 will generate an output that describes a certain event that has occurred. For example, if data vector 210 is raw data from a sensor that detects a certain piece of equipment overheating, then labeled data vector 212, when used as an input to global model 202, will cause the global model 202 to generate an output indicating that equipment (which may be secret) is overheating.

Use of the present invention thus allows sensor units in the equipment to be able to utilize their sensor data without revealing their source (in order to protect sensitive or proprietary data) and to conserve bandwidth, since the data vector 210 does not have an attached label when utilized in the manner described in FIG. 2. Furthermore, the present invention affords the use of an auxiliary dataset without labels (e.g., unlabeled public data 255) to be shared among sensor units (e.g., such that all of the sensor units are able to supply unlabeled data to the unlabeled public data 255).

In an embodiment of the present invention, the unlabeled public data is data from medical records. This affords additional protection to confidential medical records that are used for recognizing health patterns, without comprising the privacy of patients. That is, by using the private local data 251a-251n to generate the labels 253a-253n, local owners of private data can provide health care data to the global model without any labels that might compromise the privacy of the patients, since these labels are generated/provided by the local models 204a-204n in a manner that is described herein.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
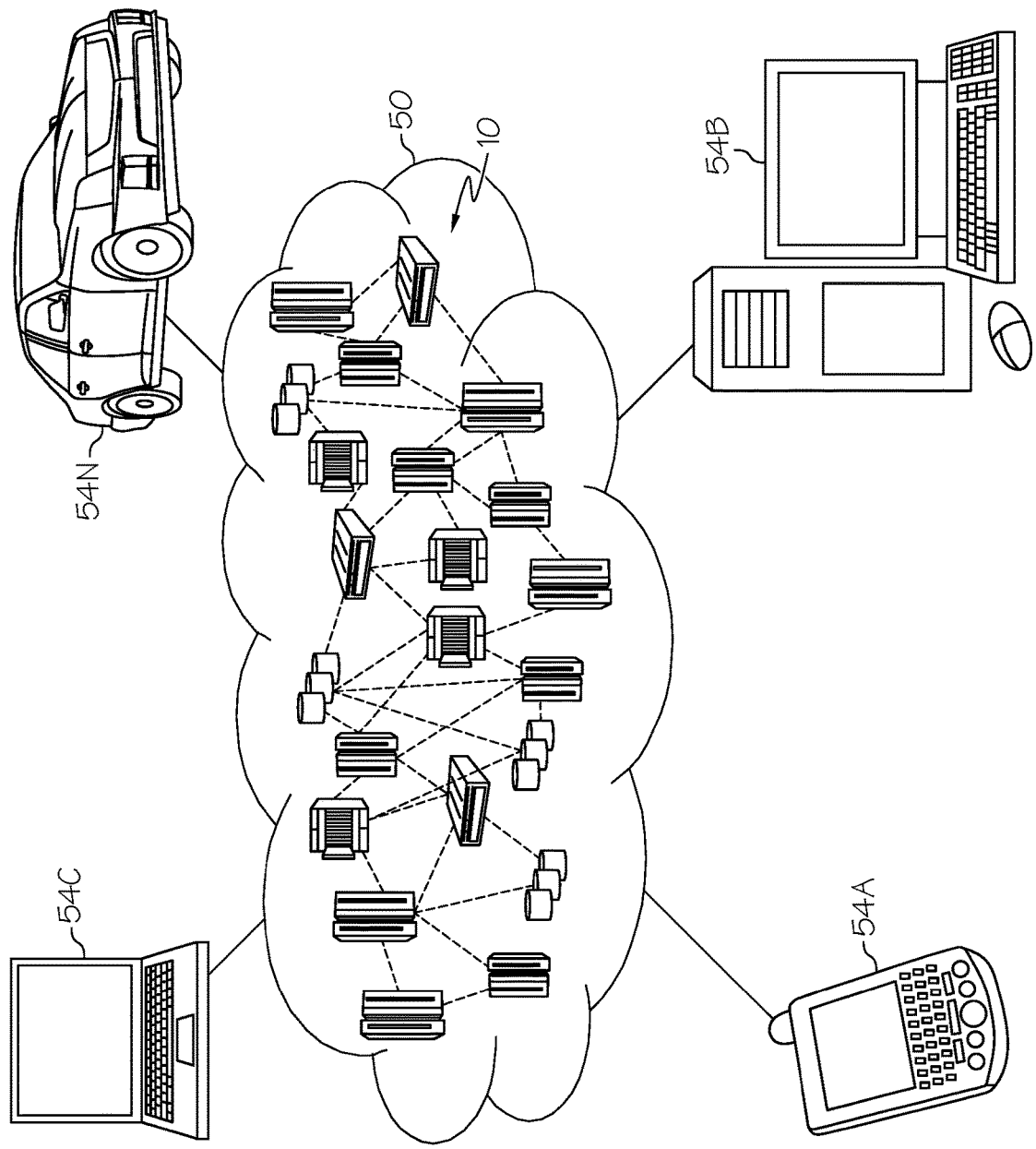
FIG. 5 depicts a cloud computing environment in accordance with one or more embodiments of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
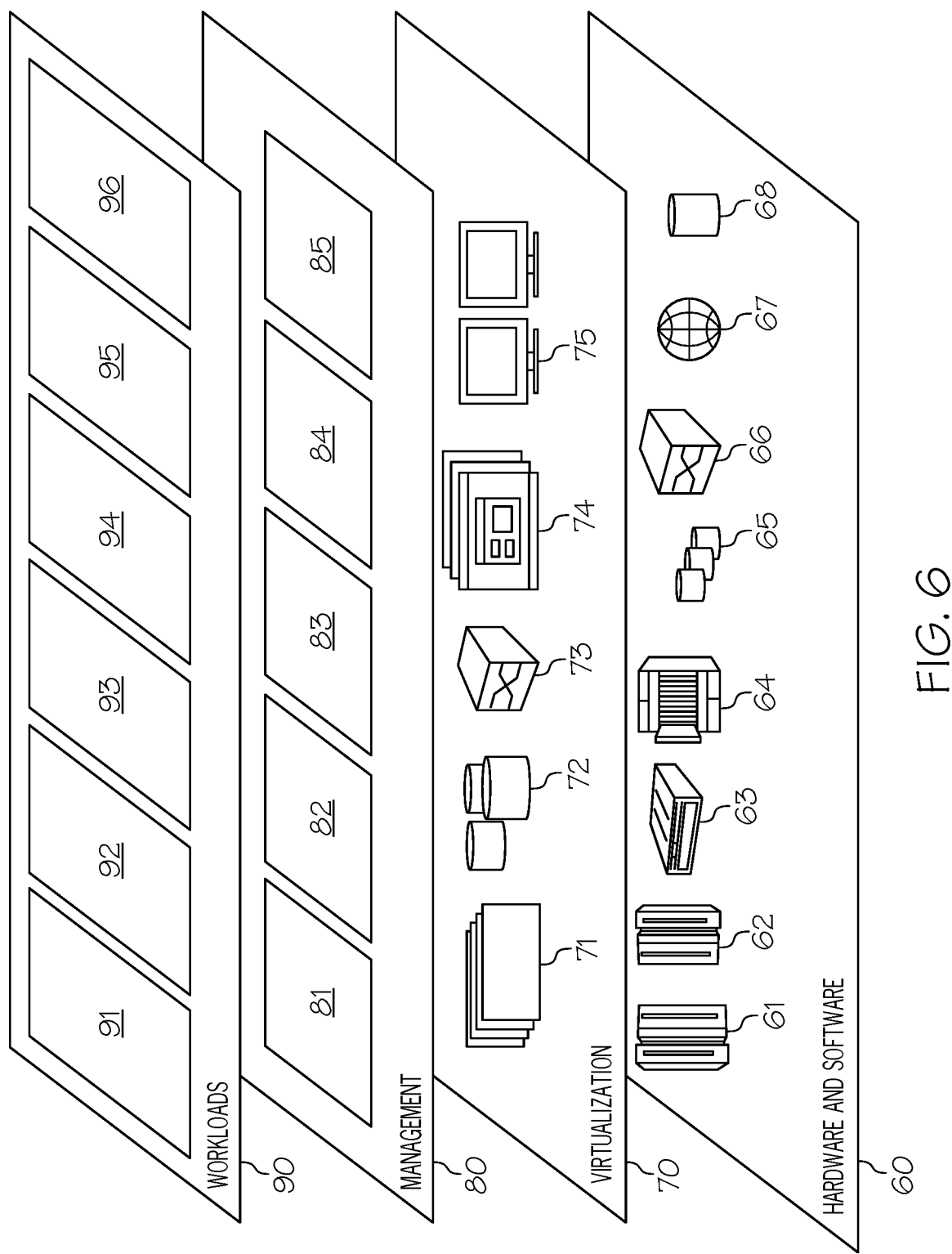
FIG. 6 depicts abstraction model layers of a cloud computing environment in accordance with one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model training processing 96, in accordance with one or more embodiments of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
    training, by one or more processors, one or more local machine learning models with local private data to create one or more trained models, wherein the one or more trained models are digital descriptions of an anomalous event that has occurred to a certain piece of equipment, and wherein the local private data is hidden from a public global model;
    generating, by one or more processors, a label for each of the local private data using the one or more trained models, wherein each label describes the corresponding local private data;
    applying, by one or more processors, the label for each of the local private data to unlabeled public data to create labeled public data, wherein the unlabeled public data is sensor data from a device from an Internet of Things (IoTs), wherein the device is equipment whose identity is secret, and wherein the sensor data is a data vector of raw data that describes an operational state of the device from the IoTs;
    inputting, by one or more processors, the data vector to the public global model to generate an output that the equipment is malfunctioning;
    comparing, by one or more processors, a first quantity of bits in a local data vector from the local private data to a second quantity of bits in a public data vector from the unlabeled public data;
    determining, by one or more processors, that the first quantity of bits matches the second quantity of bits;
    in response to the first quantity of bits matching the second quantity of bits, assigning a label corresponding to the local private data to the unlabeled public data to create the labeled public data;
    inputting, by one or more processors, the labeled public data into the public global model that uses public data; and
    training, by one or more processors, the public global model by using the labeled public data as input to the public global model.

2. The computer-implemented method of claim 1, wherein each of the one or more local machine learning models is trained using different local private data that is accessible only to one or more processors that are training said each of the one or more local machine learning models.

3. The computer-implemented method of claim 1, further comprising:
    evaluating, by one or more processors, the public global model using the input labeled public data in order to identify an object.

4. The computer-implemented method of claim 1, further comprising:
    evaluating, by one or more processors, the public global model using the input labeled public data in order to identify an event.

5. The computer-implemented method of claim 1, wherein the one or more trained models are local models that are created using the local private data, and wherein the local models and the public global model both model a same event.

6. The computer-implemented method of claim 1, wherein the one or more trained models are local models that are created using the local private data, and wherein the one or more trained models and the public global model each model different events.

7. The computer-implemented method of claim 1, wherein the local private data are pixel vectors from multiple digital photographs of a same type of object.

8. The computer-implemented method of claim 1, wherein the one or more trained models are local models that are created using the local private data, wherein the one or more trained models are digital descriptions of an event that has occurred, and wherein the one or more trained models provides a framework for digital data that identifies the event that has occurred.

9. A computer program product for labeling and utilizing unlabeled public data, the computer program product comprising a non-transitory computer readable storage medium having program instructions embodied therewith, the program instructions readable and executable by a computer to:
   train one or more local machine learning models with local private data to create one or more trained models, wherein the one or more trained models are digital descriptions of an anomalous event that has occurred to a certain piece of equipment, and wherein the local private data is hidden from a public global model;
   generate a label for each of the local private data using the one or more trained models, wherein each label describes the corresponding local private data;
   apply the label for each of the local private data to unlabeled public data to create labeled public data, wherein the unlabeled public data is sensor data from a device from an Internet of Things (IoTs), wherein the device is equipment whose identity is secret, and wherein the sensor data is a data vector of raw data that describes an operational state of the device from the IoTs;
   input the data vector to the public global model to generate an output that the equipment is malfunctioning;
   compare a first quantity of bits in a local data vector from the local private data to a second quantity of bits in a public data vector from the unlabeled public data;
   determine that the first quantity of bits matches the second quantity of bits;
   in response to the first quantity of bits matching the second quantity of bits, assign a label for the local private data to the unlabeled public data to create the labeled public data;
   input the labeled public data into the public global model that uses public data; and
   train the public global model by using the labeled public data as input to the public global model.

10. The computer program product of claim 9, wherein each of the one or more local machine learning models is trained using different local private data that is accessible only to one or more processors that are training said each of the one or more local machine learning models.

11. The computer program product of claim 9, wherein the program instructions are further readable and executable by the computer to:
   evaluate the public global model using the input labeled public data in order to identify an object.

12. The computer program product of claim 9, wherein the program instructions are further readable and executable by the computer to:
   evaluate the public global model using the input labeled public data in order to identify an event.

13. The computer program product of claim 9, wherein the program instructions are provided as a service in a cloud environment.

14. A system comprising:
   one or more processors;
   one or more computer readable memories operably coupled to the one or more processors;
   one or more computer readable storage mediums operably coupled to the one or more computer readable memories; and
   program instructions stored on at least one of the one or more computer readable storage mediums for execution by at least one of the one or more processors via at least one of the one or more computer readable memories, the program instructions comprising:
   program instructions to train one or more local machine learning models with local private data to create one or more trained models, wherein the one or more trained models are digital descriptions of an anomalous event that has occurred to a certain piece of equipment, and wherein the local private data is hidden from a public global model;
   program instructions to generate a label for each of the local private data using the one or more trained models, wherein each label describes the corresponding local private data;
   program instructions to apply the label for each of the local private data to unlabeled public data to create labeled public data, wherein the unlabeled public data is sensor data from a device from an Internet of Things (IoTs), wherein the device is equipment whose identity is secret, and wherein the sensor data is a data vector of raw data that describes an operational state of the device from the IoTs;
   program instructions to input the data vector to the public global model to generate an output that the equipment is malfunctioning;
   program instructions to compare a first quantity of bits in a local data vector from the local private data to a second quantity of bits in a public data vector from the unlabeled public data;
   program instructions to determine that the first quantity of bits matches the second quantity of bits; and
   program instructions to, in response to the first quantity of bits matching the second quantity of bits, assign a label for the local private data to the unlabeled public data to the create the labeled public data;
   program instructions to input the labeled public data into the public global model that uses public data; and
   program instructions to train the public global model by using the labeled public data as input to the public global model.

15. The system of claim 14, wherein each of the one or more local machine learning models is trained using different local private data that is accessible only to one or more processors that are training said each of the one or more local machine learning models.

16. The system of claim 14, wherein the program instructions are provided as a service in a cloud environment.

* * * * *